US007315258B2

(12) United States Patent
Dawson

(10) Patent No.: US 7,315,258 B2
(45) Date of Patent: Jan. 1, 2008

(54) SYSTEM AND METHOD FOR PROGRAMMING A CODE OF AN EMERGENCY CALL TRANSMITTER

(76) Inventor: N. Rick Dawson, One Pine Valley Cir., Ormond Beach, FL (US) 32174

( * ) Notice: Subject to any disclaimer, the term of this patent is extended or adjusted under 35 U.S.C. 154(b) by 1 day.

(21) Appl. No.: 11/201,981

(22) Filed: Aug. 11, 2005

(65) Prior Publication Data
US 2007/0035415 A1 Feb. 15, 2007

(51) Int. Cl.
G08B 23/00 (2006.01)
(52) U.S. Cl. .................... 340/870.07; 340/870.09; 455/556.1
(58) Field of Classification Search .......... 340/870.07, 340/870.09, 574; 455/556.1
See application file for complete search history.

(56) References Cited

U.S. PATENT DOCUMENTS

| 4,524,243 A | 6/1985 | Shapiro .................... 179/5 |
| 4,819,053 A | 4/1989 | Halavais ................. 342/353 |
| 4,829,285 A | 5/1989 | Brand et al. .............. 340/573 |
| 4,999,607 A | 3/1991 | Evans .................... 340/533 |
| 5,128,979 A | 7/1992 | Reich et al. ............... 379/40 |
| 5,195,126 A | 3/1993 | Carrier et al. ............. 379/45 |
| 5,337,342 A | 8/1994 | Kruger et al. ............. 379/40 |
| 5,438,607 A | 8/1995 | Przygoda, Jr. et al. ...... 379/38 |
| 5,440,301 A | 8/1995 | Evans .................. 340/870.11 |
| 5,450,064 A | 9/1995 | Williams, Jr. et al. ...... 340/574 |
| 5,521,582 A | 5/1996 | Kingston ................ 340/539 |
| 5,590,648 A | 1/1997 | Mitchell et al. ........... 128/630 |
| 5,905,436 A | 5/1999 | Dwight et al. ........... 340/573.1 |
| 5,923,253 A | 7/1999 | Anastasiou ............. 340/573.1 |
| 5,971,921 A | 10/1999 | Timbel .................. 600/300 |
| 6,032,035 A | 2/2000 | Webster et al. ........... 455/404 |
| 6,061,430 A | 5/2000 | Miller et al. .............. 379/49 |
| 6,080,106 A | 6/2000 | Lloyd et al. ............. 600/300 |
| 6,100,806 A | 8/2000 | Gaukel ................. 340/573.4 |
| 6,108,685 A | 8/2000 | Kutzik et al. ............ 709/200 |
| 6,134,303 A | 10/2000 | Chen ...................... 379/49 |
| 6,150,942 A | 11/2000 | O'Brien ................ 340/573.1 |
| 6,166,639 A | 12/2000 | Pierce et al. ........... 340/573.1 |
| 6,168,563 B1 | 1/2001 | Brown .................. 600/301 |
| 6,185,410 B1 | 2/2001 | Greene ................. 455/100 |
| 6,198,390 B1 | 3/2001 | Schlager et al. .......... 340/540 |
| 6,287,252 B1* | 9/2001 | Lugo ................... 600/300 |
| 6,577,234 B1* | 6/2003 | Dohrmann ............. 340/540 |
| 6,646,549 B2 | 11/2003 | Dawson ................ 340/531 |
| 6,765,992 B2 | 7/2004 | Dawson ................. 379/38 |
| 6,870,906 B2 | 3/2005 | Dawson ................. 379/37 |

(Continued)

Primary Examiner—Timothy Edwards, Jr.
(74) Attorney, Agent, or Firm—Allen, Dyer, Doppelt, Milbrath & Gilchrist, P.A.

(57) ABSTRACT

A system for programming a code for a wireless short range RF transmitter, for example, an emergency call transmitter or keyless entry, has a RF transmitter that transmits an RF signal containing a code. A code receiver receives a signal containing a code and a processor is operative with the code receiver and RF transmitter. A programming fixture receives the wireless transmitter within a receptacle, and the code receiver within the wireless transmitter and the code transmitter are operative with each other for transmitting a signal containing a new code from the programming fixture to the wireless transmitter. A processor is operative with the code transmitter for modulating the signal and imparting a data stream from the code transmitter to the code receiver and processor and programming a new code. The code receiver and transmitter could be coils to form a transformer.

28 Claims, 15 Drawing Sheets

U.S. PATENT DOCUMENTS

| | | | |
|---|---|---|---|
| 2003/0032446 A1* | 2/2003 | Pincus | 455/556 |
| 2003/0212311 A1* | 11/2003 | Nova et al. | 600/300 |
| 2005/0085257 A1* | 4/2005 | Laird et al. | 455/550.1 |
| 2006/0019729 A1* | 1/2006 | Harris | 455/575.6 |

* cited by examiner

US 7,315,258 B2

SYSTEM AND METHOD FOR PROGRAMMING A CODE OF AN EMERGENCY CALL TRANSMITTER

FIELD OF THE INVENTION

The present invention relates to emergency call systems, and more particularly, this invention relates to emergency call systems that include wireless short range radio frequency (RF) transmitters, for example, emergency call transmitters.

BACKGROUND OF THE INVENTION

The capability of making emergency calls are typically an element of most systems that assist the elderly. These types of emergency call systems are similar to nurse call systems in a hospital or skilled environment and are found in residential settings, which could be either single family or a community of independent living or assisted living residences. An emergency call is placed by a resident and used to summon assistance.

Usually an emergency call system includes an initiator, some type of communication system, a processor and display. These systems can broadly be classified as hard-wired, telephony or wireless, depending on the type of initiator or communication system. An example of an emergency call system that incorporates all three systems is disclosed in U.S. Pat. Nos. 6,646,549; 6,765,992; and 6,870,906, the disclosures which are hereby incorporated by reference in their entirety.

Traditional emergency call systems have typically used an initiator, having one or more call cords or other fixed devices for operation by the resident. This type of device creates a contact closure or other closed circuit for activating the emergency call. The requirement for emergency assistance is communicated using a communications system to the processor, and displayed on a display for viewing by an attendant. Any caregiver, noting the call on the display, knows that a resident requiring assistance is located at one of the devices in that residence.

In some cases, a fixed initiator is replaced with a portable, typically short range RF signal, emergency call transmitter worn by the resident, for example, a wireless pendant. The emergency call transmitter transmits an RF signal that incorporates a unique transmitter code, which is used by the processor to identify the resident. There are usually one or more compatible emergency call receivers capable of receiving a transmission from the emergency call transmitter and initiating an emergency call to a caregiver. The resident can be anywhere within their residence, whether a single family home or an apartment in a community, and can summon help without having to be at a fixed location. This combination of an emergency call transmitter and emergency call receiver typically constitutes an initiator in some emergency call systems.

The communication system that forwards the help signal to a processor at an attended location is not limited to one system, but typically could be one of three different systems: (1) using wires extending to central equipment (hard-wired); (2) using the public switched telephone network (PSTN) to make a connection to the central equipment (telephony); or (3) using an RF data circuit. In some systems, hard-wired systems typically have fixed initiators and hard-wired communication systems, while telephony systems use both fixed and wireless initiators and telephony communication systems. Wireless systems typically use a wireless initiator and either hard-wired or wireless communication systems. Different examples are set forth in the incorporated by reference '549, '992 and '906 patents.

The processor and display could be located at the assisted living or independent living community, or in the case of single family residences, could be located at a geographically remote location. The display could be a computer screen, textual or graphic enunciator, pocket pager, cell phone screen or PDA.

Usually when a fixed initiator is used, a caregiver knows that the resident is located near one of the fixed devices in an apartment or single family residence. With a wireless initiator, however, the resident could be located within the coverage area covered by the emergency call transmitter and emergency call receiver. For example, in an independent living or assisted living community, the resident could be anywhere within the building. In a single family residence, the resident could be in any room of the residence.

There have been several techniques to determine a more precise location of a monitored resident during an emergency when using a wireless system. For example, the processor could identify the locations of one or more of the emergency call receivers that receive an RF signal from an emergency call transmitter. A display could list those locations, or present a graphic indicating the likely area in which the resident is located, based on the received locations. If the relative RF signal strength at each emergency call receiver is known, that information could be used to refine the likely area in which the resident that activated the emergency call is located.

These systems have not always been feasible because the RF signals propagate within a structure, and are subject to attenuation as the RF signal passes through walls and floors. The RF signals are also subject to reflection as the signals encounter various surfaces. These reflections cause the signal to traverse the distance from a transmitter to a receiver over many different paths creating multipath delays. Because each path has a different length than the other paths, the phases of the signals arriving via the multiple paths will vary. As signals of various phases are combined at the receiving antenna, the resulting signal strength is, in the aggregate, typically much more or much less than would be encountered in a reflection free environment. This "multipath fading" is well known and can create an ineffective emergency call system. This type of system will also have a similar effect on more complex attempts using time-based ranging. Also, the passage of RF signals through floors further complicates the location attempt in three-dimensional space.

As noted above, wireless emergency call systems typically use wireless emergency call transmitters, for example, wireless pendants that are formed as short range RF transmitters. Besides emergency call systems, other short range RF transmitters are used in a variety of applications from garage door openers to keyless entry systems for automobiles and homes, as well as the emergency call systems for the elderly as discussed. A short range RF transmitter, for example, an emergency call transmitter, contains a unique code identifying a particular transmitter to a receiver. In some devices, the code had been set by a mechanical system, for example, "DIP switches." In that system, both the transmitter and receiver would include DIP switches, and the DIP switches in both systems would be set to the same code, allowing the receiver to perform a desired output when a matching code is received from the transmitter. In other cases, a receiver determined a code to which it should respond, or sometimes the receiver responded to several different codes, each producing a different result.

Mechanical DIP switches are not favored because they are expensive, compared to the overall cost of the transmitter, and also require a manufacturer or user to open the case or housing for access, ruling out a substantially waterproof transmitter. Also, DIP switches can be set incorrectly, resulting in failure of the entire system.

Typically, modern short range RF transmitters used as emergency call transmitters are given permanent codes when they are manufactured. The code is incorporated into the programming of the device, or set in a permanent memory, such as an EEPROM. In some cases, the receiver is "taught" the code by performing a specified sequence that includes activating the short range RF transmitter in the presence of the receiver. In still other cases, the receiver may receive all codes and forward them to other equipment, which will recognize and interpret the code. In other cases, special equipment programs the code into the receiver. In any event, replacement of these short range RF transmitters, such as emergency call transmitters, is a labor intensive operation. Supplying a short range RF transmitter with a given code is impractical, particularly when tens or hundreds of thousands or more of different codes exist. Stocking several of each code for replacement purposes is cost prohibitive, while manufacturing custom codes to order is impractical.

One well established alternative has been to program the short range RF transmitter after it is manufactured through an appropriate connector that is connected to a special programmer. This type of system is low cost and quick, but cannot be used with a short range RF transmitter that has been permanently sealed, for example, for waterproofing, because its enclosure cannot be opened without destroying the device.

SUMMARY OF THE INVENTION

In view of the foregoing background, it is therefore an object of the present invention to provide a system that programs a code for a wireless short range radio frequency (RF) transmitter, such as an emergency call transmitter or keyless entry.

This and other objects, features and advantages are provided by a system that programs a code for a wireless short range RF transmitter, such as emergency call transmitter. In one aspect, the emergency call transmitter includes a coil and processor operative therewith that processes a code. The emergency call transmitter also includes an RF transmitter that transmits an RF signal containing the code.

A programming fixture has a transmit coil and a receptacle for receiving the emergency call transmitter, such that when the emergency call transmitter is received within the receptacle, the coils within the emergency call transmitter and the programming fixture form an air-core transformer. A processor in the programming fixture is operative with the transmit coil for keying an AC signal applied to the transmit coil and imparting a data stream from the receive coil to the processor in the emergency call transmitter and programming a new code.

In another aspect, the emergency call transmitter can be formed as a wireless pendant adapted to be worn by a user.

The programming fixture could be connected to a personal computer or local area network to provide programming instructions, which could be displayed on a display. The programming fixture can also include a receiver that receives RF signals containing the new code from the emergency call transmitter for verifying a new code.

In another aspect, the wireless transmitter can have a code receiver that is operative with a code transmitter of a programming fixture that receives a signal containing the code. This signal could be an acoustic signal, such as an ultrasonic signal, an infrared signal, an electromagnetic signal, or a magnetic flux signal. A method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with one aspect of the invention, the system as described determines the location of a resident within a monitored residence during an emergency. The residence could be a single family residence in a community of independent living or assisted living residences. Typically a residence will have a number of different rooms. In another aspect, a short range RF transmitter, for example, an emergency call transmitter, can now be programmed even when the emergency call transmitter is permanently sealed, for example, with a waterproof housing, without destroying the emergency call transmitter.

FIGS. 1A-1D illustrate an example of a type of emergency call system using wireless, direct connect and telephone subsystems that can be adapted for use in accordance with one example of the invention. Further details of the system described in FIGS. 1A-1D are shown and explained in the incorporated by reference '549, '992 and '906 patents.

Figure 1A:
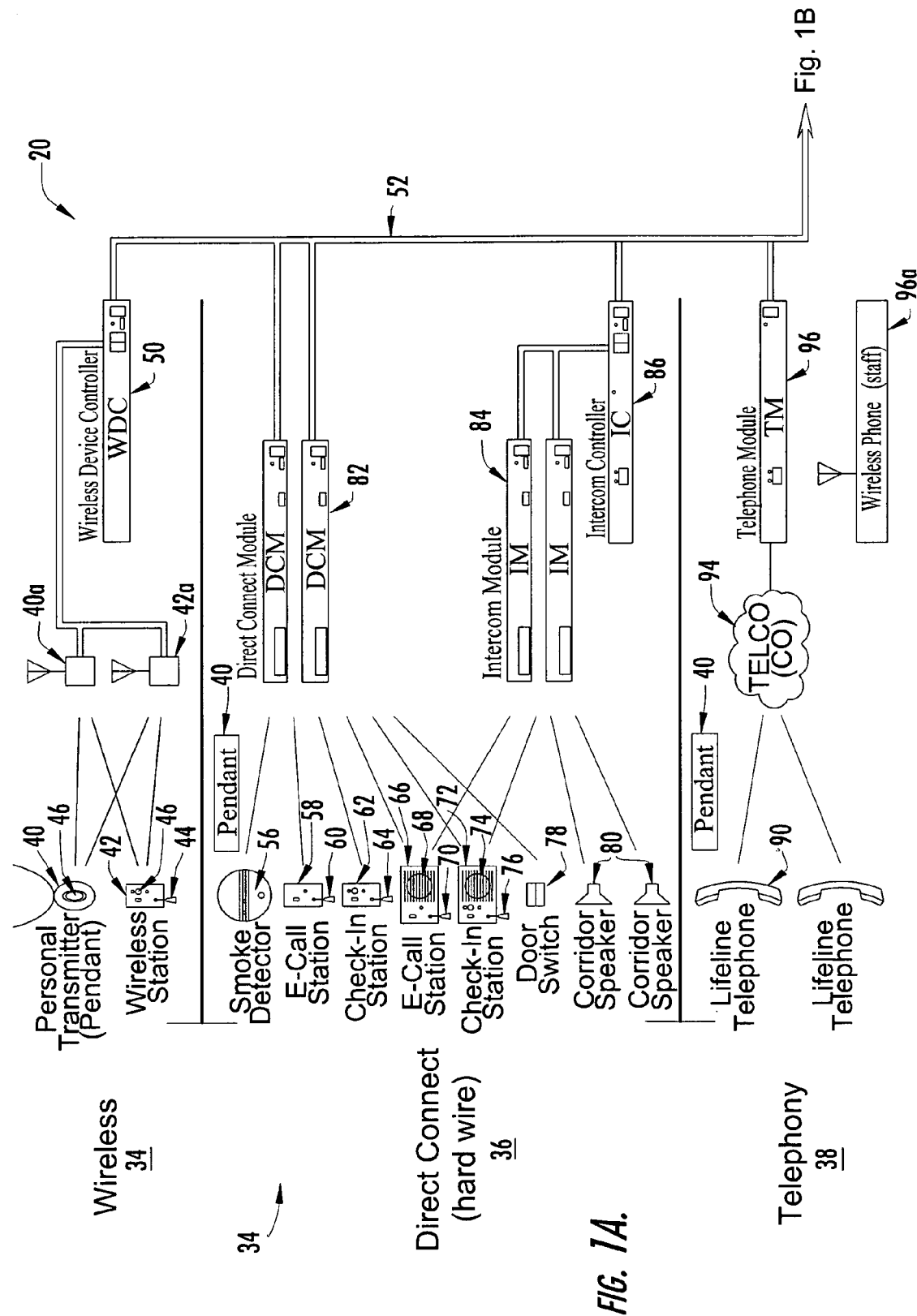
FIGS. 1A and 1B are block diagrams of an emergency call system that can be adapted for use with the present invention and illustrating wireless, direct connect and telephone subsystems having modules that are operative with a bus controller through a common bus in a head-end platform.

An emergency call system 20 that can be adapted for use with different embodiments of the invention described relative to FIGS. 2-13 is set forth in FIGS. 1A, 1B, 1C and 1D. The invention is not limited to the discussed embodiment in FIGS. 1A-1D, but can, of course, be used with any wireless emergency call system. As illustrated, an emergency call system 32 is associated with each property (premises) and is responsive to alarm events, including smoke detector alarms, personal transmitter alarms, e.g., wireless, for example, an emergency call transmitter, pendants or telephone calls. Each emergency call system includes one of at least a wireless subsystem 34, a direct connect subsystem 36, and a telephone subsystem 38, as shown in FIG. 1A. The subsystems are controlled by modules integrated into one head-end platform 100 and plugged by modules into a data bus 54a, as explained below.

The wireless subsystem 34 includes at least one personal transmitter unit, i.e., an emergency call transmitter formed as a short range RF transmitter 40 configured in one example as a pendant that is typically worn around the neck by a resident of the premises. The unit 40 could be other types of transmitter pendants or wireless devices, as known to those skilled in the art. A resident in trouble can actuate the pendant or it can be actuated, such as by bodily functions (e.g., temperature decrease, fever, etc.) or other means. A wireless alarm signal is generated typically as an RF signal to a wireless receiver 40a, for example, an emergency call receiver. Wireless emergency call receivers can be placed at 100 foot centers, such as by providing a wireless system placed every 10 rooms or thereabouts within a retirement community.

A wireless emergency station 42 can include a pull line 44 or toggle, as known to those skilled in the art. A resident, who is having an emergency, can pull the emergency line 44 to generate a wireless alarm signal as an RF signal that is picked up by wireless emergency call receivers 40a, 42a. The wireless emergency call receivers 40a, 42a receive the generated alarm signals and are operatively connected in one non-limiting example to a wireless device module (WDC) of a head-end platform 100, which, in turn, is operatively connected to a plurality of wireless emergency call receivers located throughout the property at a plurality of locations. The wireless subsystem not only uses pendants as emergency call transmitters that are worn by residents, but can also use other personal and wireless transmitters as emergency call transmitters. It is possible for a wireless transmitter as an emergency call transmitter to be contained within a wristwatch or key chain.

In operation, if a resident presses a transmitter button 46, such as on a pendant, wrist watch or key chain, or pulls the pull line 44, the wireless alarm signal as an RF signal is generated to a wireless emergency call receiver. In the wireless subsystem, there does not have to be two-way communication. As is typical with these elderly and senior care facilities where high reliability is required, the wireless transmitters and/or pendants typically would use a lithium battery or other power device known to those skilled in the art. An advantage of the wireless subsystem 34 is any receivers and transmitters can be added to existing structures as add-ons, and installed as original equipment or replace standard emergency call stations. Wireless emergency call transmitters as stations 42 include the standard pull-for-help toggles or pull lines 44 and/or buttons 46. A wireless device module 50 as part of the head-end platform receives converted alarm signals from the wireless emergency call receivers 40a, 40b, and transmits electrical alarm signals according to a predefined protocol over a common BUS 52 to a BUS controller 54 that is operative with the direct connect (hard-wired) subsystem 36 and telephone subsystem 38 through respective modules at the head-end platform.

As shown in FIG. 1A, the direct connect subsystem 36 includes various types of hard-wired devices, typically positioned within an apartment, such as a smoke detector 56, emergency call station 58 with the pull line 60, a check-in station 62 with a pull line 64, an emergency call station 66 with an intercom speaker 68 and pull line 70, a check-in station 72 with an intercom speaker 74 and pull line 76, a door switch 78, corridor speaker 80, and other devices such as a security screen (not shown), also known as a wander screen, as known to those skilled in the art. Wireless pendants as emergency call transmitters 40 could also be used and be interoperative with a receiver located in one of the stations. Naturally, these are only non-limiting examples and other devices suggested by those skilled in the art are possible. A direct connect module (DCM) 82 is operative with the various devices. An optional intercom module (IM) 84 is operative via an intercom controller (IC) 86 with emergency call stations, check-in stations, and corridor speakers for allowing two-way communication.

The direct connect emergency call stations 66 and check-in stations 72 permit staff members of retirement communities to have direct, two-way communication into a resident's apartment or premises in case of any emergency. Any type of direct connect emergency call station (check-in or not) can have two-way voice as long as the intercom type station has a speaker. This is advantageous because the sound of a human voice can be reassuring to any resident in distress. In the direct connect subsystem, it is possible that there are also some check-in stations without speakers. A 900 megahertz phone or other phone device can display the type and location of the emergency. Because an addressable intercom can be used, the staff no longer is required to maintain constant access to a control console. Using emergency information received through a phone or other similar device, the staff members can respond rapidly and appropriately to the needs of residents. The phone can be used to address instantly communication with some or all residents and different staff members through designated speakers as part of a cordless speaker or other speaker system.

Check-in stations 62 used on the direct connect subsystem advantageously allow a means for ensuring that all residents are healthy and feeling well. These stations 62 can act as a roll call, such that staff can maintain an awareness of each resident. For example, each morning residents could press a button located on the check-in station 62 to proclaim that they are up and well. If there is no check-in by a resident, then an alert signal could be generated after a predetermined period of time. The check-in station 62 provides an advantageous method to maintain electronic monitoring of residents that staff members may not see. It should be understood that "check-in" is also available on the previously described wireless subsystem and the telephone subsystem, but operates differently by allowing a button to be pushed as in a wireless subsystem.

The telephone subsystem 38 can be used as a retrofit installation where voice-to-voice communication is required. A resident telephone 90 connects directly to the telephone module 96 via the telephone company switching system 94, such as a public switched telephone network. The telephone module 96 in turn can connect to a wireless telephone 96a used by an attendant, such as a nurse.

A telephone adapter card for communicating with staff phones could be included within the module. The telephone module 96 allows connection and control of many different telephones within the overall system. An example of a resident telephone that could be used in the present invention is a telephone manufactured by Lifeline®.

As shown in FIG. 1A, the wireless device module 50, direct connect module 82, intercom module 84, and intercom controller 86, and telephone module 96 connect into the common BUS 52, which is operatively connected to the BUS controller 54 to control the various and numerous alarm signals and other data signals generated by the various modules used in the wireless, direct connect and telephone subsystems 34, 36 and 38. The BUS controller 54 and other modules operatively form a head-end platform 100 where various alarm signals are captured and processed. The bus controller could include bus circuitry and appropriate plug-in points for connecting other modules as suggested by those skilled in the art.

The head-end platform 100 can include different components, such as the illustrated LCD annunciator 102, a printer adapter 104 with associated ink jet, laser or other printer 106, a personal computer adapter 108 connected to a personal computer 110, a paging apparatus 112 for generating a paging signal in response to an alarm signal, such as pendant actuation or a line pull on an emergency call station. The paging apparatus 112 includes a pager adapter 114 and pager base station 116. The various printer, personal computer, and pager adapter could be formed as adapter cards to fit into slots on various modules in the head-end platform 100.

An internet module 120 can be formed as an internet adapter, which could have an associated processor 120a, is connected to the BUS 52 and receives alarm data from various modules and generates corresponding data in association with other devices, like a computer 110, and transports the data through an internet service provider (ISP) 122 over the Internet 124 to a home computer 126, monitoring station 128 or e-mail device 130. The internet module could also connect directly to the telephone company to a call network server, which is accessed by users through the web as described below. The internet module is operative with three subsystems individually or as a group and can be connected to other systems not having a data bus and bus controller by techniques known to those skilled in the art.

The annunciator 102 is typically an LCD based device that uses soft buttons and a menu structure to display and control the emergency call system and associated alarm. The annunciator 102 can work in operation with the associated printer 106. The personal computer 110 allows supervision and control of emergency calls, various alarms, and resident check-in, and is operative with an associated interface, such as a graphical user interface, to provide instant access of resident information, alarm calls, and alarm conditions, with an appropriate database for record keeping. The printer 106 provides a printed report of all system events. Essential information and data can be brought up via the personal computer 110 when an alarm is sounded by a specific resident, such as the name of the appropriate physician, allergies, next-of-kin, and pastor. Different report capabilities can track date, response times and check-in history and can be stored in the computer for rapid retrieval.

The paging apparatus in the form of a cord, module or other means 112 includes the pager adapter 114 and pager base station 116. If there is an operator console, it does not have to be staffed 24 hours a day. The pager adapter 114 could receive various alarm signals or telephone alarm calls typically via the BUS (in some cases wireless), and generate a signal to the base station to generate a paging signal to a pager carried by at least one staff member. Naturally, pagers can be small, lightweight and offer an audio or silent alarm option.

Figure 1B:
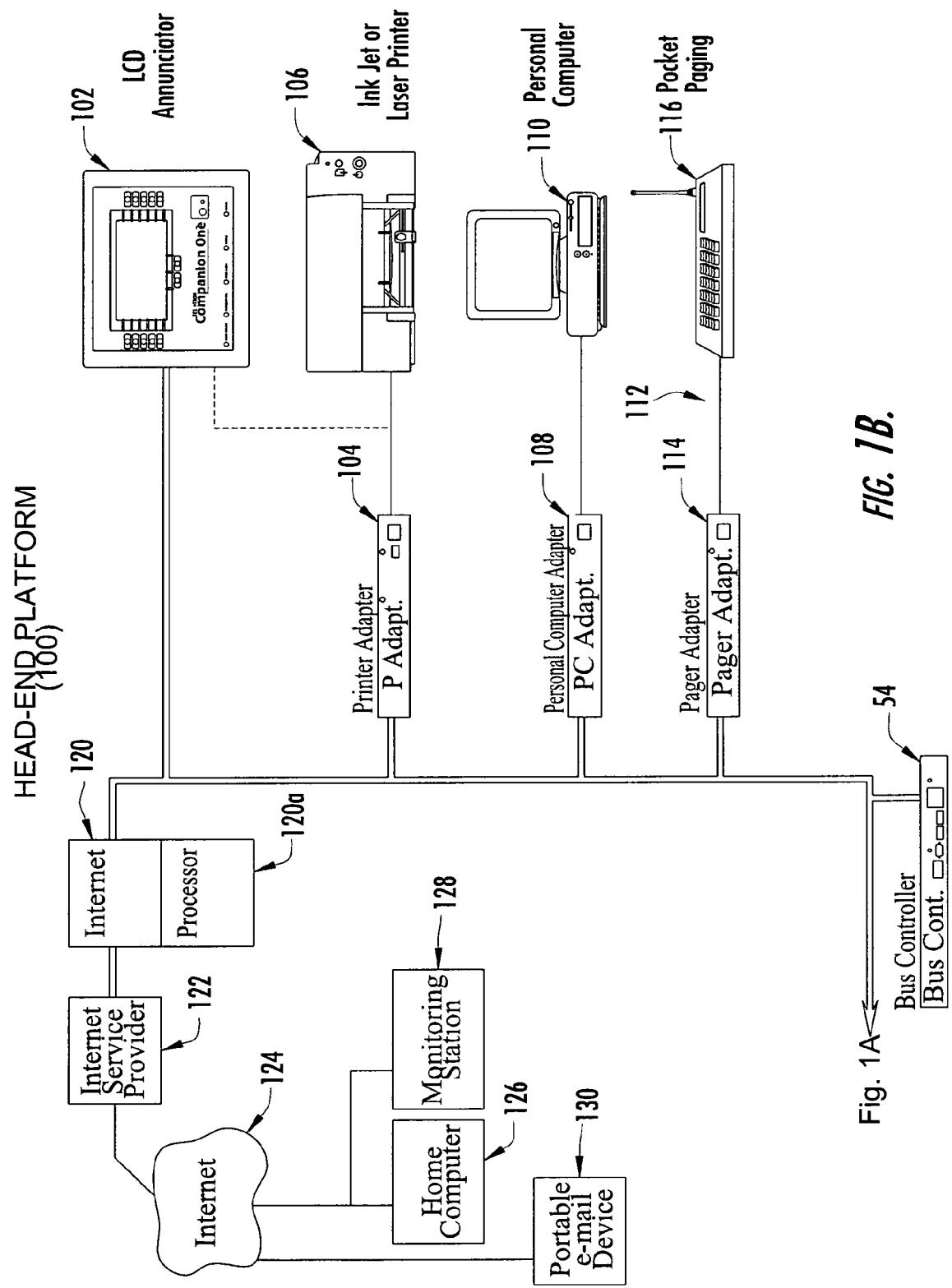

FIG. 1B also illustrates that the BUS controller 54 is operative to control alarm signals and telephone alarm signals to the internet module 120, where the associated processor 120a can process any required data for the generation of alarm data signals with the appropriate codes to an Internet Service Provider 122 or to a server (FIG. 1C) for transmission as data packets across the Internet 124 into the home computer 126 or other monitoring station 128. The internet module can also work with other components of the head-end platform 100.

Figure 1C:
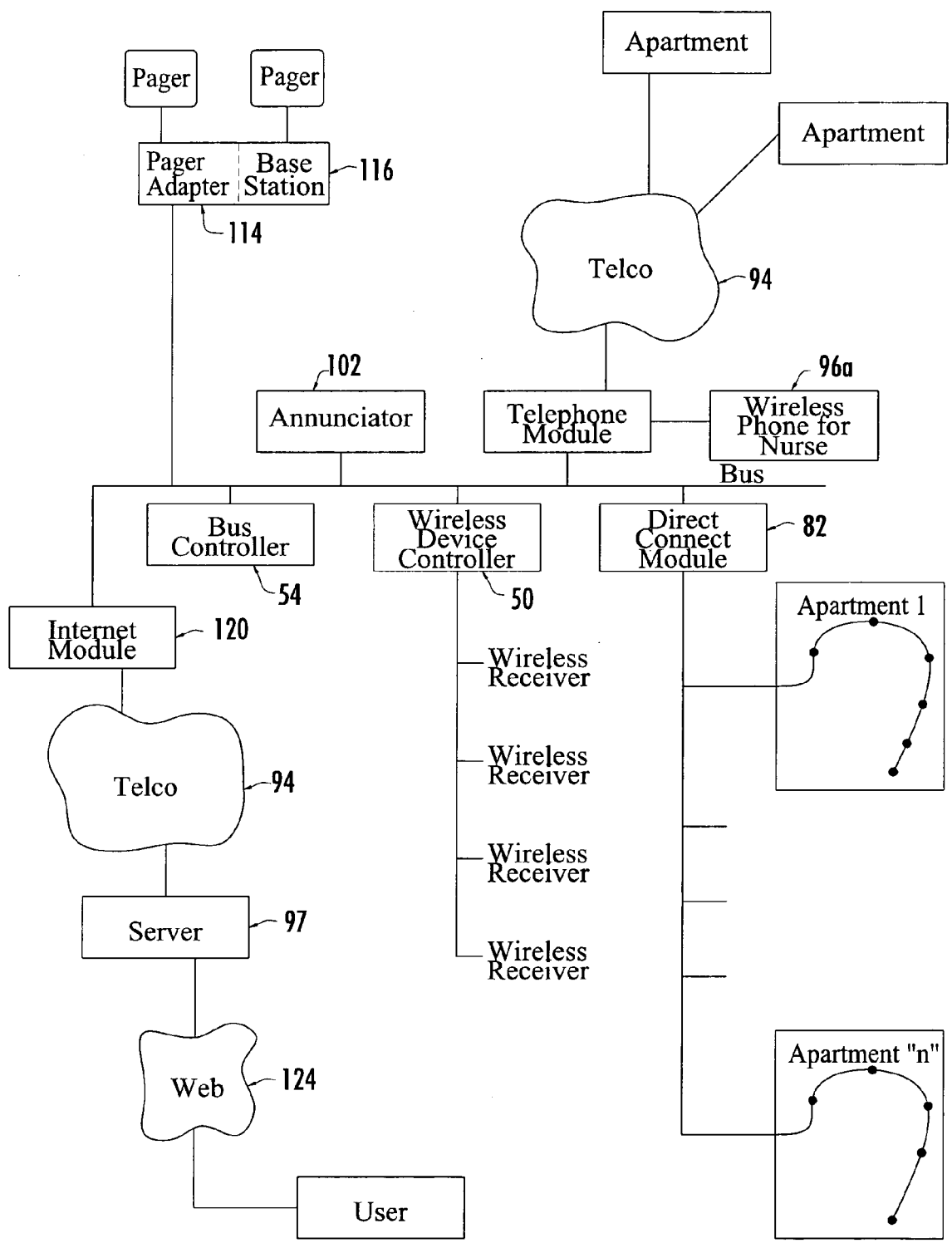
FIG. 1C is a block diagram showing a data bus and various modules that can be connected to the data bus and operative with the emergency call system shown in FIGS. 1A and 1B.

FIG. 1C illustrates another block diagram showing details of the various modules and the data bus 54a and the interconnection among various components of the illustrated emergency call system. The data bus 54a is illustrated as a straight line and can be part of the bus controller 54, which can include various jacks for connection of modules, such as the annunciator 102, telephone module 96, wireless device module 50 and direct connect module 82. The pager adapter (module) 102 and internet module 120 are connected into the bus. Telephones contained within various departments of the property connect via the telephone company to a telephone module 96 of the present invention, which in turn, connect to the wireless phone 96a for the staff. The internet module 120, in one aspect of the invention, connects to the telephone company network 94, and in turn, connects to a system server 97 that is operated by the system operator. The server, in turn, can connect into the internet 124 and via the web to a user such as a manager. The wireless device module includes another bus with various wireless receivers 40a connected onto the bus as known to those skilled in the art. The direct connect module connect to another bus with various hard-wired connections that extend into apartments where the various dots indicate the different device, as shown in FIG. 1A.

Figure 1D:
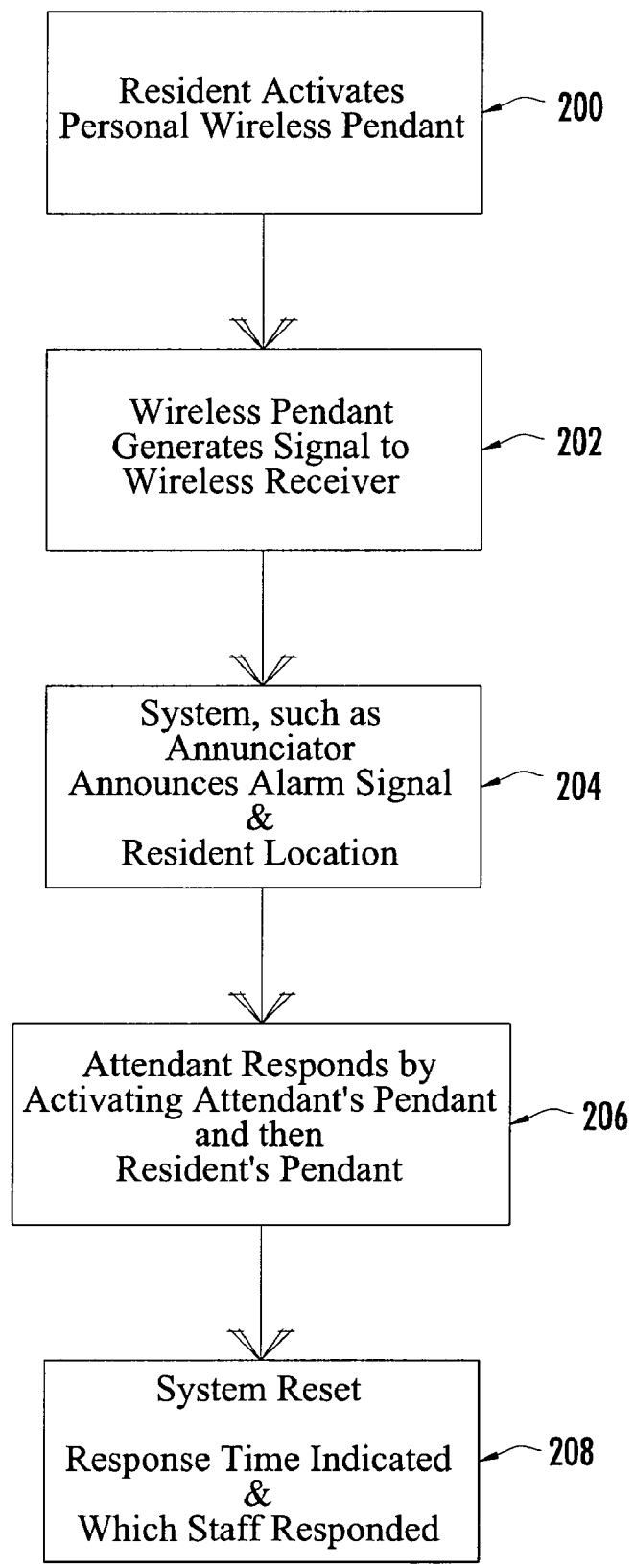
FIG. 1D is a flow chart illustrating a method of operating an emergency call system where an attendant responds to an alarm signal for clearing the system after an alarm signal is generated, and determining the response time to the alarm signal received from the wireless emergency call transmitter of a resident.

FIG. 1D illustrates a flow chart where a wireless device module and annunciator can be cleared using resident and attendant pendants. For example, a resident actuates a wireless pendant as an emergency call transmitter that the resident is wearing (block 200). The alarm signal is generated to the wireless receiver and into the wireless device module (block 202). The annunciator is actuated, which in turn, could actuate a pager or a staff phone through means known to those skilled in the art (block 204). A staff member responds and resets the system by touching first his own pendant that emitted the wireless signal and then touching the resident pendant (block 206). The system is reset and the system, such as through the annunciator or other means, determines the length of time the staff member took to respond and which staff member responded. The "staff reset" pendant contains a unique code identifying which staff pendant was used for a reset.

As noted before, if a long period of time is taken to respond, an alert or other notification could be sent via the internet to a manager at home or to another staff member through appropriate means.

Referring now to FIGS. 2-13, details of the system and method for determining the location of a resident within a monitored residence during an emergency, and details of the system and method for programming a code of an emergency call transmitter are set forth in detail. Reference numerals begin in the 300 series for description purposes.

Figure 2:
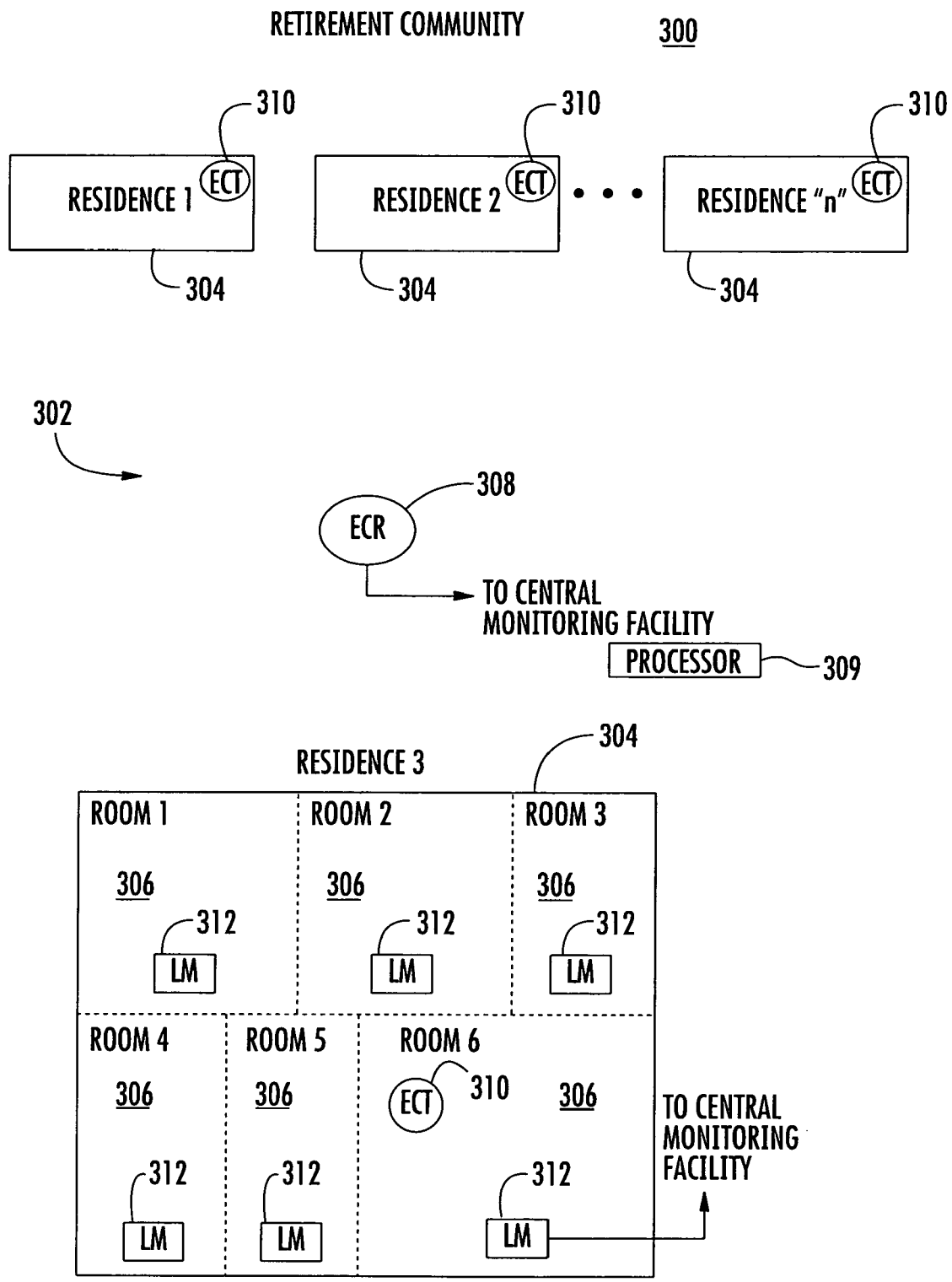
FIG. 2 is a block diagram of a retirement community having a plurality of residences, and showing one residence with various rooms, a location monitor positioned within each room, and an emergency call transmitter such as worn by a resident positioned in one of the rooms in accordance with one embodiment of the invention.

FIG. 2 is a block diagram showing a retirement community 300 having an emergency call system 302 in a plurality of different residences 304. Residents can be located when they are not in their particular apartment, but elsewhere in the building. One residence is shown in detail and includes a plurality of different rooms 306, in this example, six rooms as illustrated. An emergency call receiver 308 is located near the illustrated residences 304, and provides receiver coverage for wireless emergency call transmitters 310 worn by each resident in this non-limiting example. Each room 306 in accordance with this non-limiting example includes a location monitor 312, which in some embodiments could be adapted for use as an emergency call receiver. A resident is in one of the rooms, room 6, and carries an emergency call transmitter 310, such as a wireless pendant worn by the resident. Two different examples of location monitors 312 and emergency call transmitters 310 can be used as will be explained in detail later. In some instances, the location monitor 312 is operative similar to an emergency call receiver 308 and connected to a central facility, such as a head-end platform through a communications system. Typically, the emergency call transmitter 310 includes an RF transmitter that is resident activated during an emergency for transmitting an RF signal containing a transmitter code indicating the identity of the emergency call transmitter. In one example, the emergency call transmitter includes a receiver section that receives an infrared or acoustic signal from a location monitor 312. This signal contains a location code identifying the location or room. In response, the emergency call transmitter would transmit an RF signal containing the location code and possibly also the transmitter code to an emergency call receiver 308, such as described before. A processor 309 would receive signals having the codes and process them to obtain the location.

In this example, a location monitor would be positioned within an area of the residence potentially containing the resident and emergency call transmitter, and typically within each room. Each location monitor stores a location code identifying the area of the location monitor, for example, the room in which the location monitor is positioned. In this example as described, a location monitor 312 includes a receiver for receiving the RF signal from the emergency call transmitter. In response, the location monitor would transmit an infrared or acoustic signal containing the location code to the emergency call transmitter. The transmitter in the location monitor 312 could be an infrared emitter or ultrasonic transducer to emit an infrared or ultrasonic signal containing the location code. The emergency call transmitter would receive the infrared or acoustic signal containing the transmitter code and location code from the location monitor, and in response, transmit an RF signal containing the location code (and possibly transmitter code) to an emergency call receiver or other receivers as part of the emergency call system 302.

In another non-limiting example, the emergency call transmitter includes the RF transmitter for transmitting the RF signal containing the transmitter code, and an infrared or acoustic transmitter that transmits an infrared or acoustic signal to the location monitor during an emergency. The location monitor could include a receiver for receiving the infrared or acoustic signal from the emergency call transmitter. An RF transmitter in the location monitor transmits an RF signal containing the location code to an emergency call receiver or to the emergency call transmitter. An emergency call receiver, such as described above, could receive RF signals from the emergency call transmitter alone, or the location monitor and an associated processor, such as part of the head-end platform, could be operative for receiving the RF signals from one or both the location monitor and emergency call transmitter and determine the room location of the emergency call transmitter.

Figure 3:
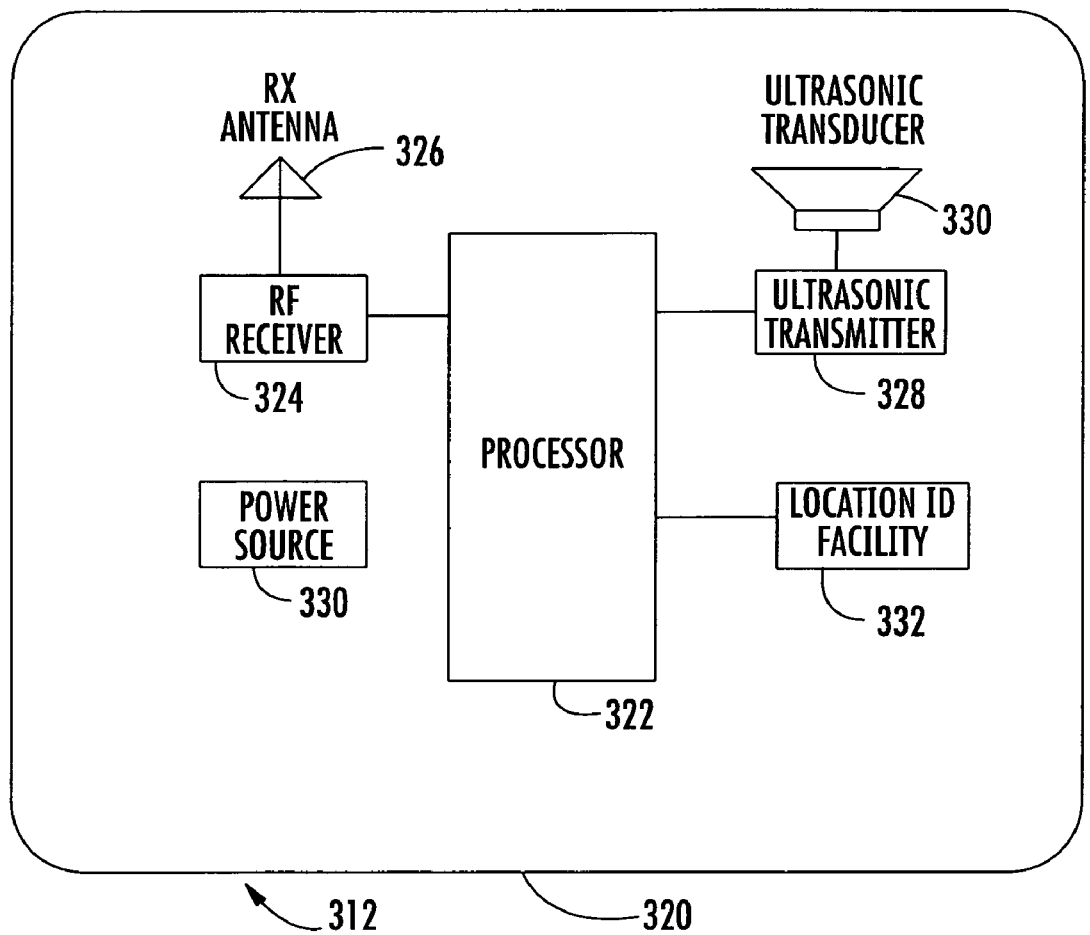
FIG. 3 is a block diagram of an example of a location monitor such as shown in FIG. 2.

FIG. 3 is a block diagram showing one example of a location monitor 312 that includes a housing 320 containing the various components. The housing is preferably waterproof and durable. The internal components could include a central processor 322 and an RF receiver 324 with an antenna 326 that receives RF signals from the emergency call transmitter 310. An ultrasonic transmitter 328 and ultrasonic transducer 330 are operative with the processor 322. A power source 330 provides power for the RF receiver 324, processor 322 and ultrasonic transmitter 328. The receiving antenna 326 and RF receiver 324 receive any RF signals from the emergency call transmitter 310 and pass the data to the processor 322, which checks the data, and if it is valid, responds by sending the location code to the ultrasonic transmitter 328. The location code is sent by keying the ultrasonic transmitter 328 using traditional serial data methods, in one non-limiting aspect. Any type of protocol can be used, such as NRZ, Manchester and other protocols known to those skilled art, as long as the emergency call transmitter 310 can interpret the signal. The location code is determined by the location ID facility 332, for example, a memory that stores values, for example, an EEPROM or similar memory. Alternatively, the location ID facility 332 could be a mechanical DIP switch system or similar types of systems.

Figure 4:
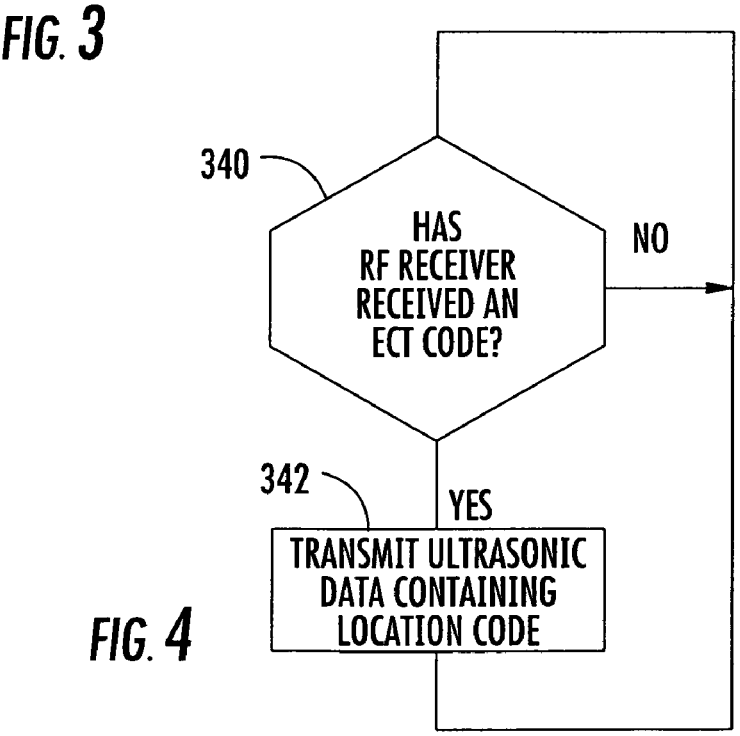
FIG. 4 is a high level flow chart illustrating a non-limiting example of a sequence of operation for the location monitor.

FIG. 4 is a high level flow chart illustrating one example of the sequence of operation of the location monitor 312. As shown at block 340, a determination is made whether the radio frequency receiver has received an emergency call and transmitter code by checking the database or other memory at the location ID facility 322. If the answer is no, the loop continues, and if yes, the ultrasonic signal having data containing the location code is transmitted (block 342).

Figure 5:
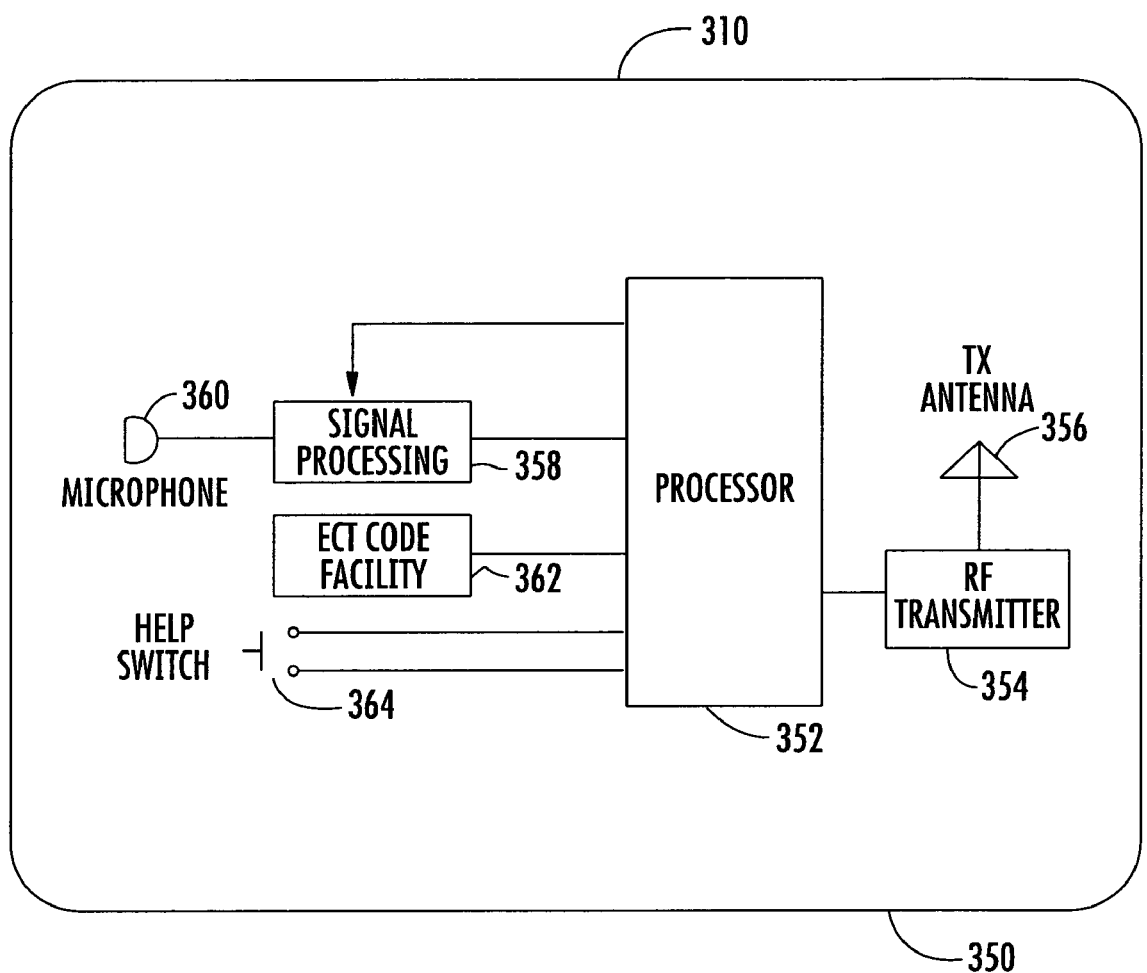
FIG. 5 is a block diagram of an example of an emergency call transmitter that can be used in accordance with the invention.

FIG. 5 is a block diagram showing basic functional components used in one example of an emergency call transmitter 310. In this non-limiting example, the emergency call transmitter includes a housing 350 containing the various components, including a processor 352 and the RF transmitter 354 with the associated transmit antenna 356. The housing is preferably compact, such as a wireless pendant, and waterproof. Signal processing circuitry 358 is associated with the processor 352, and a microphone 360 is operative therewith for receiving acoustic, for example, ultrasonic signals in this one non-limiting example. The microphone 360 could be replaced by another receiver for receiving infrared signals, as one non-limiting example. An emergency call transmitter code facility 362 is associated with the processor 352. A help switch 364 activates the processor 352 as described before.

In operation, when the help switch 364 is closed, the RF transmitter 354 and transmit antenna 356 send the help request and the transmitter code, which is determined by the code facility 362, for example, a value stored in an EEPROM memory or similar memory, or set mechanically by DIP switches as described before. After that RF transmission, the signal processing circuitry 358 and microphone 360 is powered in this example. The signal processing circuitry 358 in one example could be formed as a bandpass filter tuned to the frequency of the ultrasonic transducer 330 in the location monitor 312. It could also perform level analysis to discriminate the comparatively high level signal from the location monitor 321 within the room in which it is located from a comparatively low level signal from nearby rooms. The processor 352 interprets a signal from the location monitor 312 and transmits the location code using the RF transmitter 354 and transmit antenna 356 in a format compatible with that used to send the help request from the emergency call transmitter.

Figure 6:
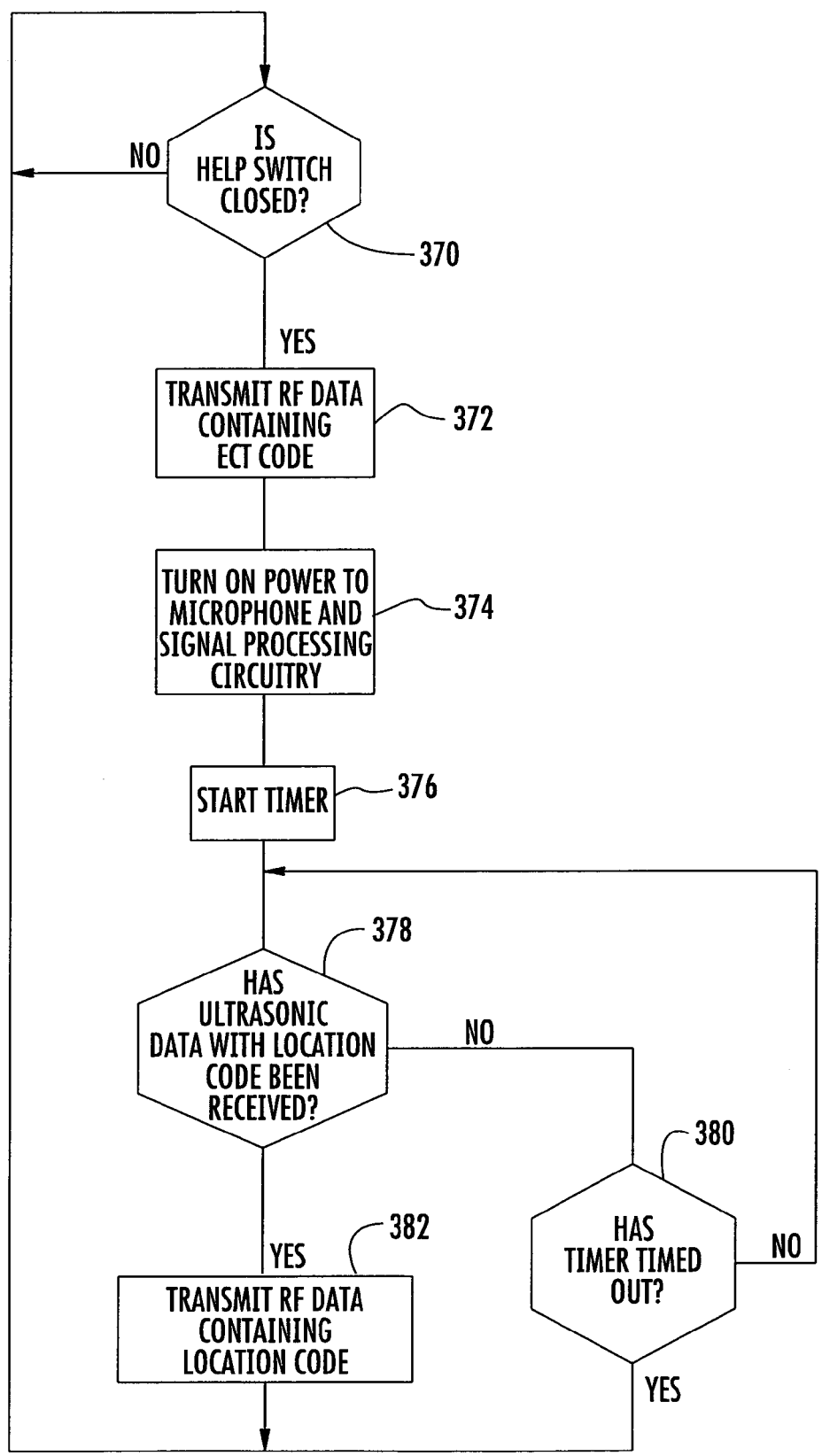
FIG. 6 is a high level flow chart of an example of the sequence of operation of the emergency call transmitter in accordance with the invention.

FIG. 6 is a flow chart illustrating one example of a sequence of operation used with the emergency call transmitter 312. A determination is first made if the help switch is closed (block 370), and if not, the loop continues. If the help switch is closed, then the RF signal having data containing the emergency call transmitter code is transmitted (block 372). The power is turned on to the microphone and the signal processing circuitry (block 374), and a timer starts (block 376). A determination is then made whether the ultrasonic signal having data with the location code has been received (block 378), and if not, then a determination is made if the timer has timed out (block 380). If not, then the loop continues. If the location code has been received, then the RF signal is transmitted having data containing the location code (block 382)

It should be understood that different embodiments could include an emergency call transmitter 310 that emits an audible sound when an emergency call is initiated. This audible sound would lead a caregiver to the resident after the location is approximated by reporting the locations of any emergency call receivers 308 that receive the RF signal. Because the audible sound is not required for the location when the resident is in his/her apartment in an area of the single family residence where their location is obvious, the emergency call transmitted may be equipped with a delay to emit only the audible sound if the help switch is held several seconds. This could be enhanced by placing a location monitor 312 in each room, with the location monitor assigned a unique location code (or room code) as described before, and containing any microphone and signal processing circuitry to discriminate the audible sound from the emergency call transmitter from any background sound. When the sound from an emergency call transmitter 310 is detected, the location monitor 312 will report its location code to the emergency call receiver 308 and thus to any processor that combines the transmitter code and location code so that any display can present the resident requiring assistance and their location.

Because the audible tone could offend a perceived need for privacy, an ultrasonic signal could be used instead of the audible sound, while still being an acoustic signal. Of course, the location monitor would contain a receiver similar to the emergency call receiver as described above and could function as an emergency call receiver in that it is connected by an appropriate communication pathway eliminating the need for a separate emergency call receiver. This connection could be by a public switched telephone network (PSTN), an internet or wireless connection. It is also possible to replace the ultrasonic signal with an infrared signal while replacing the ultrasonic transducer in the emergency call transmitter 310 with an infrared emitter and the microphone in the location monitor 312 with an infrared detector.

Referring now to FIGS. 7-13, details of a programming system for an emergency call system are explained in detail. Reference numerals begin in the 400 series for new elements not explained before.

The system can program a code for a wireless short range RF transmitter, such as an emergency call transmitter, for example, a wireless pendant as described above. The emergency call transmitter 310 can include a receive coil, operative with a processor that processes the code. The RF transmitter transmits an RF signal containing the code. A programming fixture can have a transmit coil and receptacle for receiving the emergency call transmitter such that when the emergency call transmitter is received within the receptacle, the coils within the emergency call transmitter and programming fixture form an air-core transformer. A processor within the programming fixture can be operative with the transmit coil for keying an AC signal applied to the transmit coil and imparting a data stream from the receive coil to the processor and programming a new code within the processor of the emergency call transmitter.

In another aspect, the wireless transmitter can include a code receiver that receives a signal containing a code. The code receiver could receive infrared, electromagnetic, acoustic or magnetic flux signals from the programming fixture, which would include a code transmitter that respectively transmits a short range signal containing the code. This signal could be infrared, electromagnetic, acoustic or magnetic flux, in non-limiting examples.

Figure 7:
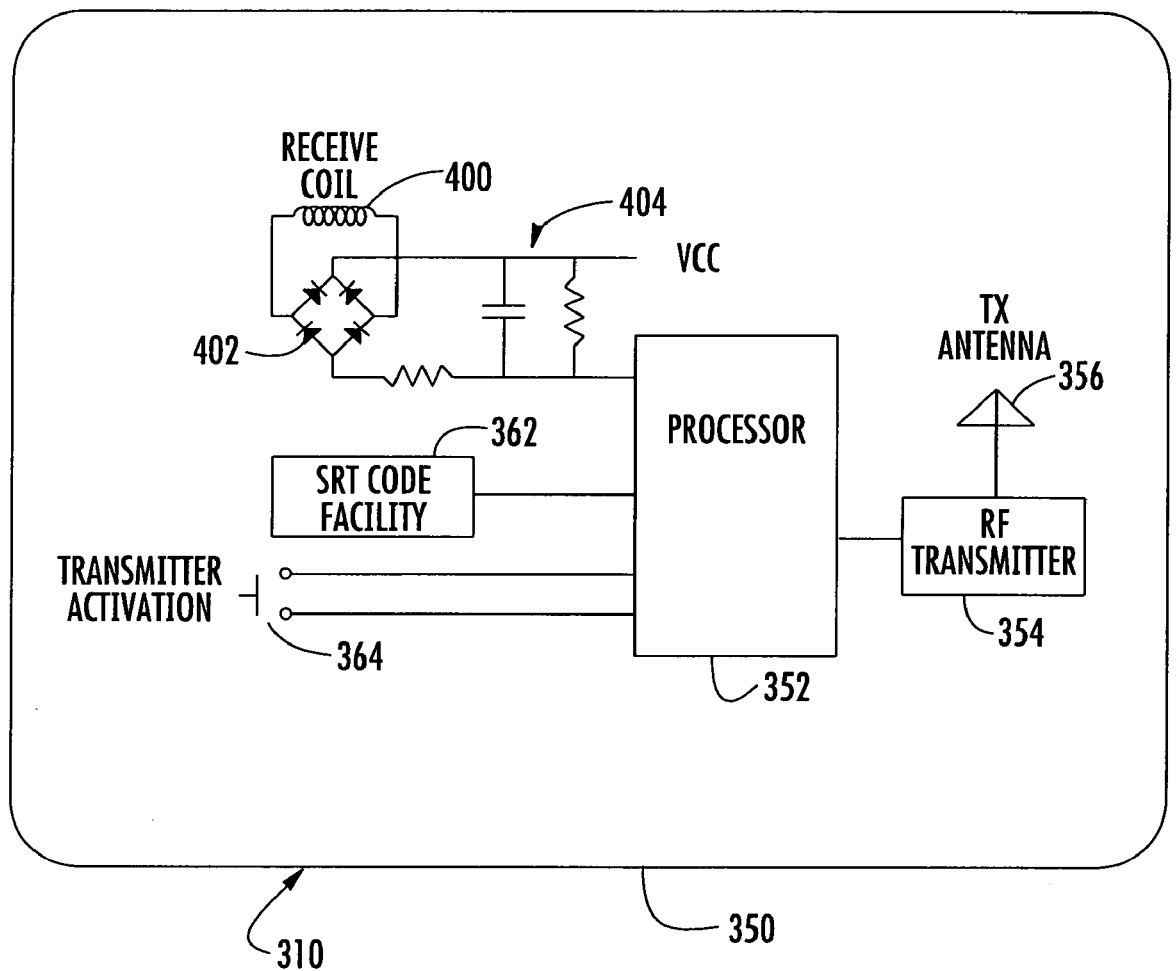
FIG. 7 is a block diagram of an example of a short range RF transmitter as an emergency call transmitter that can be programmed in accordance with the invention.
Figure 13:
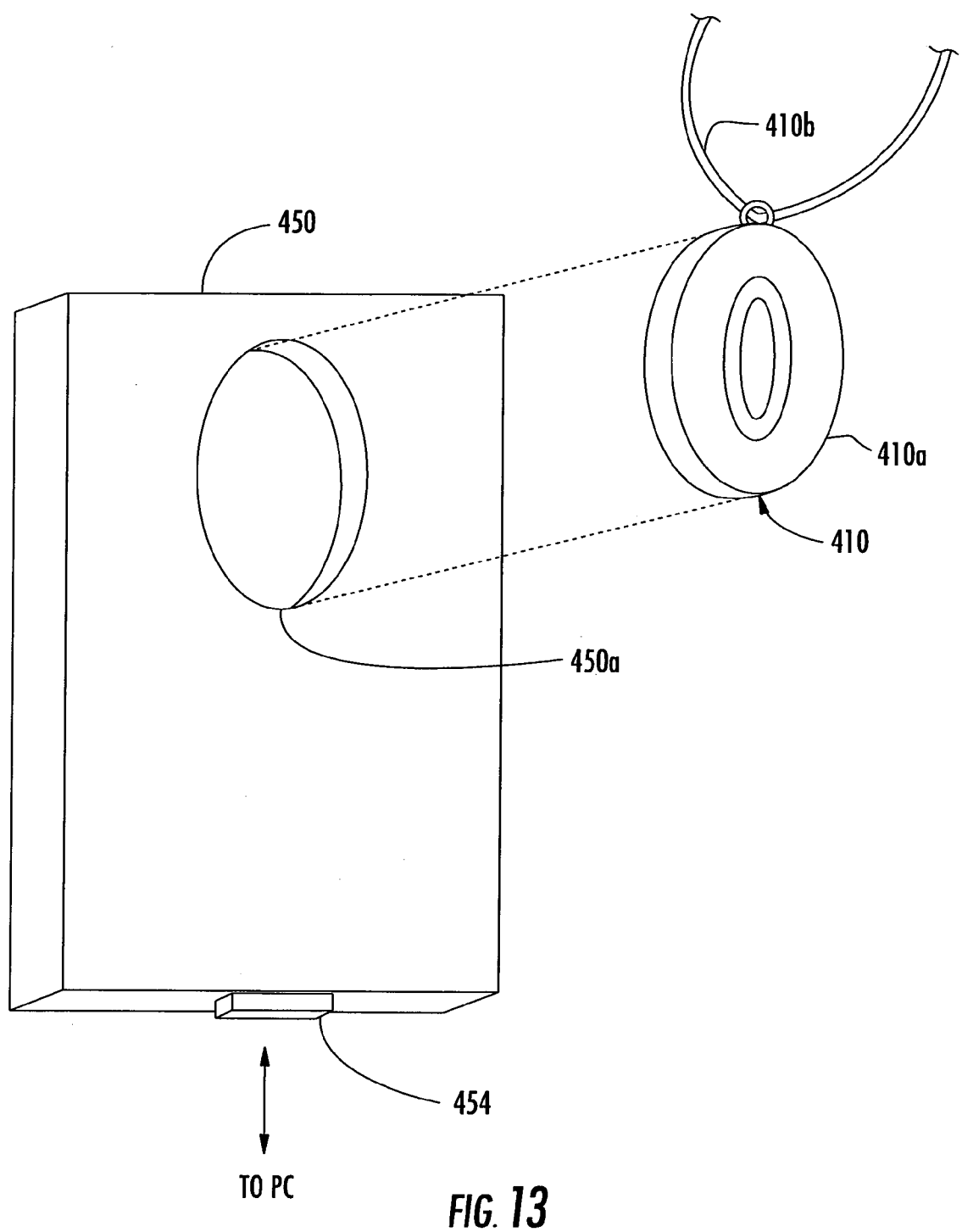
FIG. 13 is an isometric view of the programming fixture and its recess that receives the emergency call transmitter as a wireless pendant in accordance with one example of the invention.

FIG. 7 is a schematic block diagram of a short range radio frequency (RF) transmitter, for example, in this embodiment, an emergency call transmitter 310 that could be formed such as a wireless pendant. FIG. 7 illustrates common functional elements as shown in FIG. 5, for example, the housing 350, processor 352, code facility 362, transmitter activation switch 364, RF transmitter 354, and the transmit antenna 356. In this non-limiting embodiment, data is received by a receive coil 400 and the signal is rectified within a full bridge rectifier 402 and filtered within a capacitor and resistor network 404 forming a signal filter. The filtered signal is presented to the processor 352 for interpretation and action in storing a new code within the emergency call transmitter. The code facility 362 could be any type of memory as explained before, including an EEPROM or other memory device, but because programming is used, DIP switches are not used in this example. The emergency call transmitter 310 as illustrated contains a transmitter activation switch 364 and the RF transmitter 354, and transmitter antenna 356 contained within the housing 350, for example, a wireless pendant housing such as shown in FIG. 13.

Figure 8:
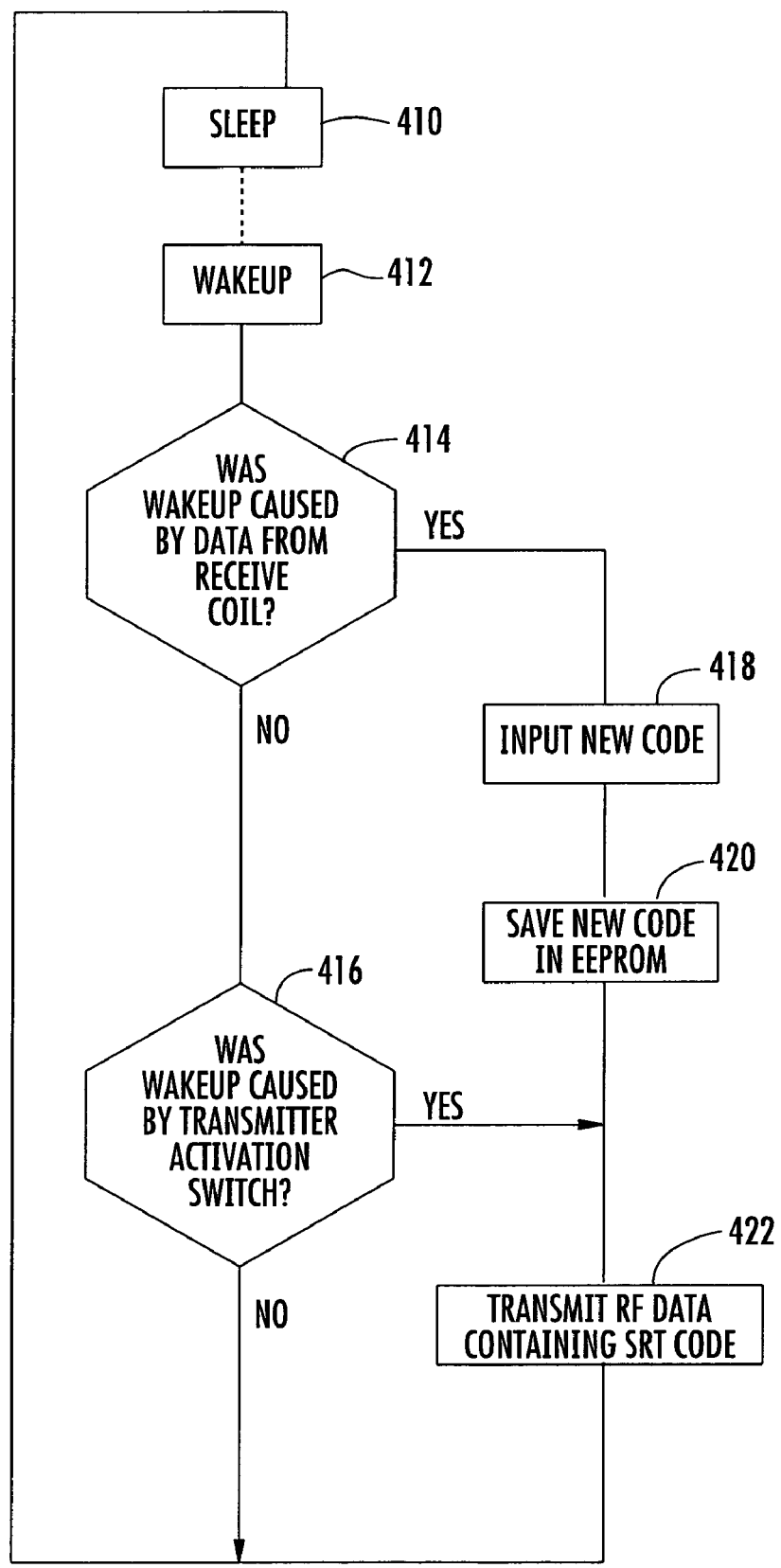
FIG. 8 is a high level flow chart illustrating an example of the sequence of operation for the short range RF transmitter as an emergency call transmitter in accordance with the invention.

FIG. 8 is a block diagram showing an example of the sequence of operation for the emergency call transmitter 350 as shown in FIG. 7.

The system is normally in a "sleep" mode (block 410) and activated into a "wake up" mode (block 412). A determination is made whether the "wake up" was caused by data from the receive coil (block 414). If not, then a determination is made whether the "wake up" was caused by the transmitter activation switch (block 416), and if not, the loop continues. If the "wake up" was caused by data from the receive coil, a new code is input (block 418) and saved within the EEPROM memory (block 420). The RF data containing the new emergency call transmitter code is transmitted (block 422). If the "wake up" was caused by the transmitter activation switch, the RF signal having data containing the code is transmitted.

Figure 9:
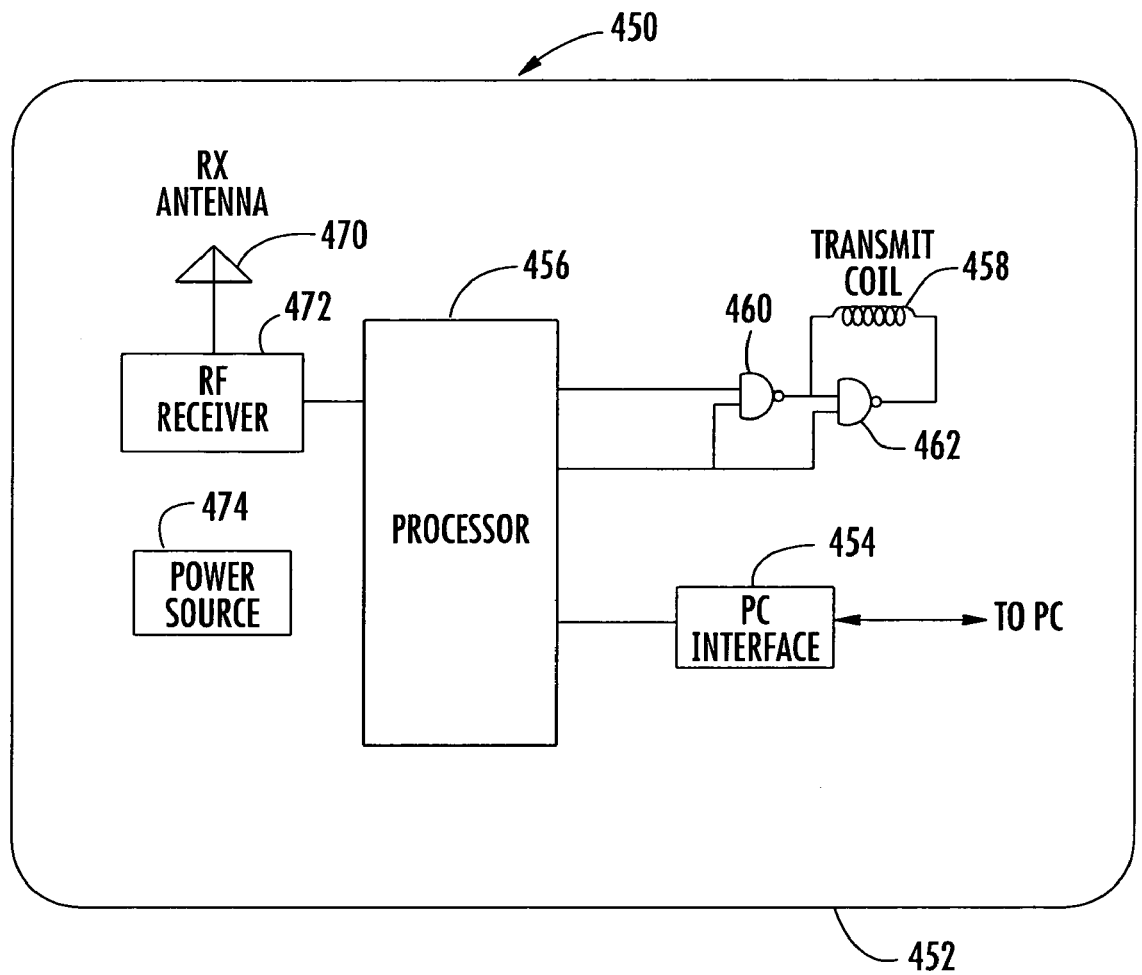
FIG. 9 is a block diagram of an example of a programming fixture that receives the short range RF transmitter as an emergency call transmitter in accordance with the invention.

FIG. 9 is a schematic block diagram showing basic functional components in a programming fixture 430 in accordance with one non-limiting example of the invention. The various components for the programming fixture are contained within a housing 452. The programming fixture 450 can include a personal computer (PC) interface 454 that passes data to and from a personal computer. When an application program is running on the personal computer and sends a new code to be programmed into the emergency call transmitter, a processor 456 formats the data stream and sends it to a transmit coil 458. The processor 456 also incorporates an oscillator circuit that drives a first NAND driver 460 and second NAND driver 462. The outputs of a first and second NAND drivers 460, 462 provide a push-pull driver for the transmit coil 458. The resultant signal is keyed by the processor 456 driving common input pins on the two NAND drivers 460, 462. When any common input pins are low, the NAND driver outputs are both high, stopping current flow through the transmit coil 458. When the common input pins are high, the NAND drivers function as inverters. The receiving antenna 470 and RF receiver 472 receive any signals and code from the emergency call transmitter and interprets the code and sends it to the personal computer for display to verify the code. Of course, the programming fixture could include additional processor capability and a display and push button functionality for enhancing programming without the requirement of a personal computer. Also, the personal computer interface could be another type of interface for connecting to a local area network, such as an Ethernet connection. A power source 474 provides power for the various components.

Figure 10:
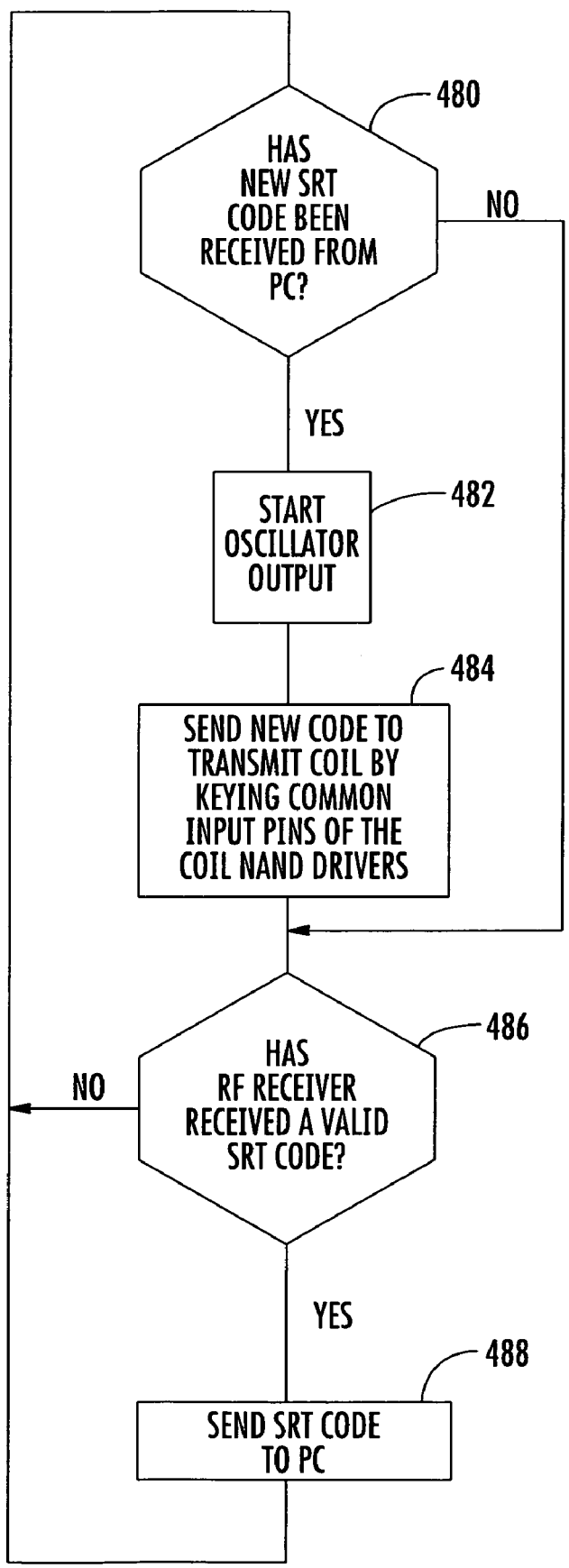
FIG. 10 is a high level flow chart illustrating one example of the sequence of operation for the programming fixture.

FIG. 10 is a high level flow chart showing an example of the sequence of operation for the programming fixture 450. A determination is first made whether an emergency call transmitter code has been received from the personal computer (block 480), and if yes, the oscillator output is begun (block 482). The new code is sent to the transmit coil by keying common input pins of the coil NAND drivers (block 484). If the new emergency call transmitter code had not been received from the personal computer, then the previous steps are skipped, and a determination is made whether the RF receiver has received a valid emergency call transmitter code (block 486), which also occurs if the new code is sent (block 484). If not, the loop continues, and if yes, the emergency call transmitter code is sent to the personal computer for verification.

Figure 11:
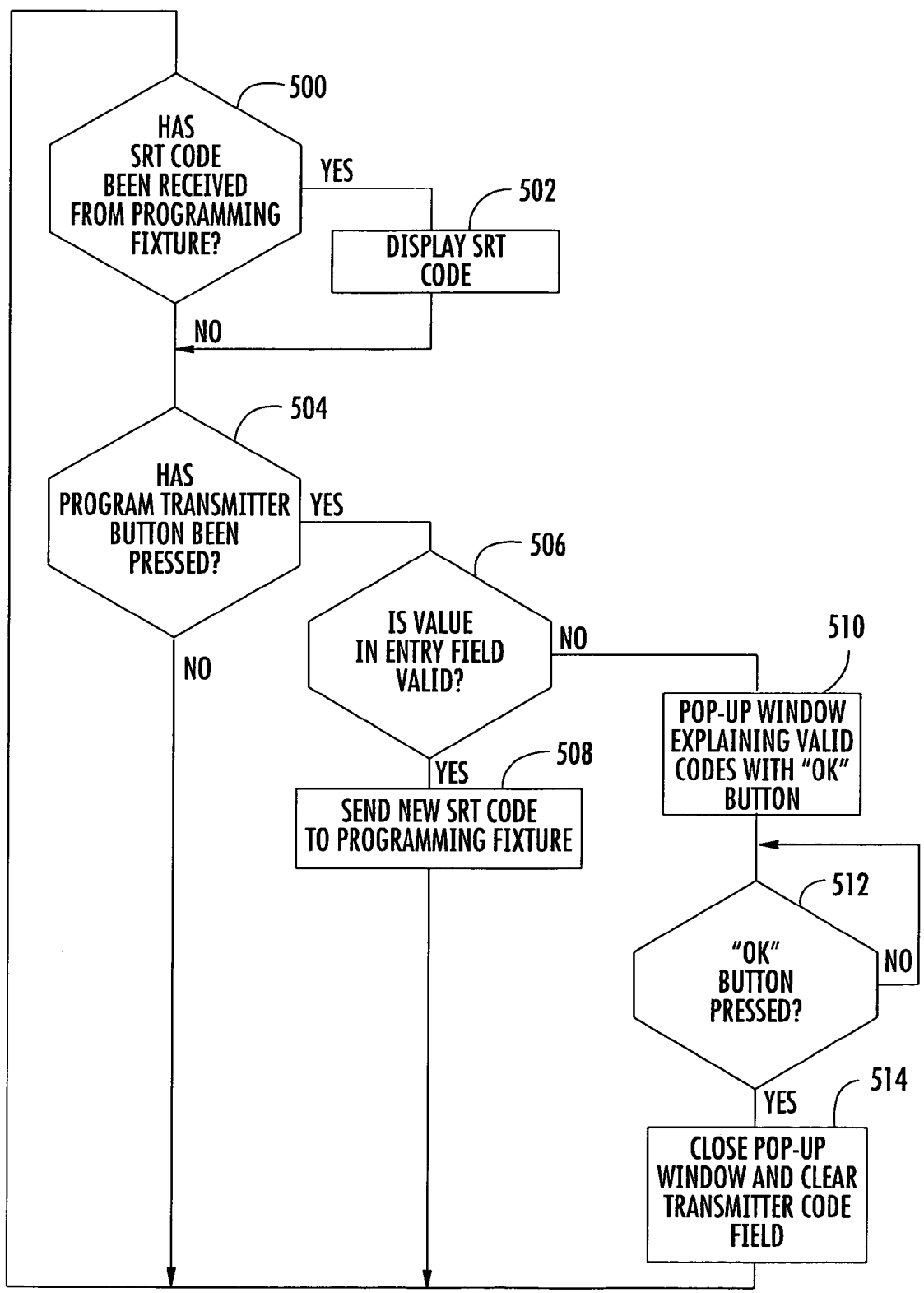
FIG. 11 is another high level flow chart illustrating a sequence of operation of an application program running on a personal computer and operative with the programming fixture.

FIG. 11 is a high level flow chart illustrating one example of the sequence of operation for an application running on a personal computer and used for programming an emergency call transmitter. A determination is first made whether the emergency call transmitter code has been received from the programming fixture (block 500), and if yes, the emergency call transmitter code is displayed (block 502). If not, then a determination is made whether the program transmitter button has been pressed (block 504), and if not, the loop continues. If yes, then a determination is made whether the value in the entry field is valid (block 506), and if yes, then a new emergency call transmitter code is sent to the programming fixture (block 508). If the value in the entry field is not valid (block 506), then a new pop-up window explains the valid codes with an "OK" button (block 510). A determination is then made whether the "OK" button is pressed (block 512), and if not, the loop continues. If yes, the pop-up window and clear transmitter code field is closed (block 514).

Figure 12:
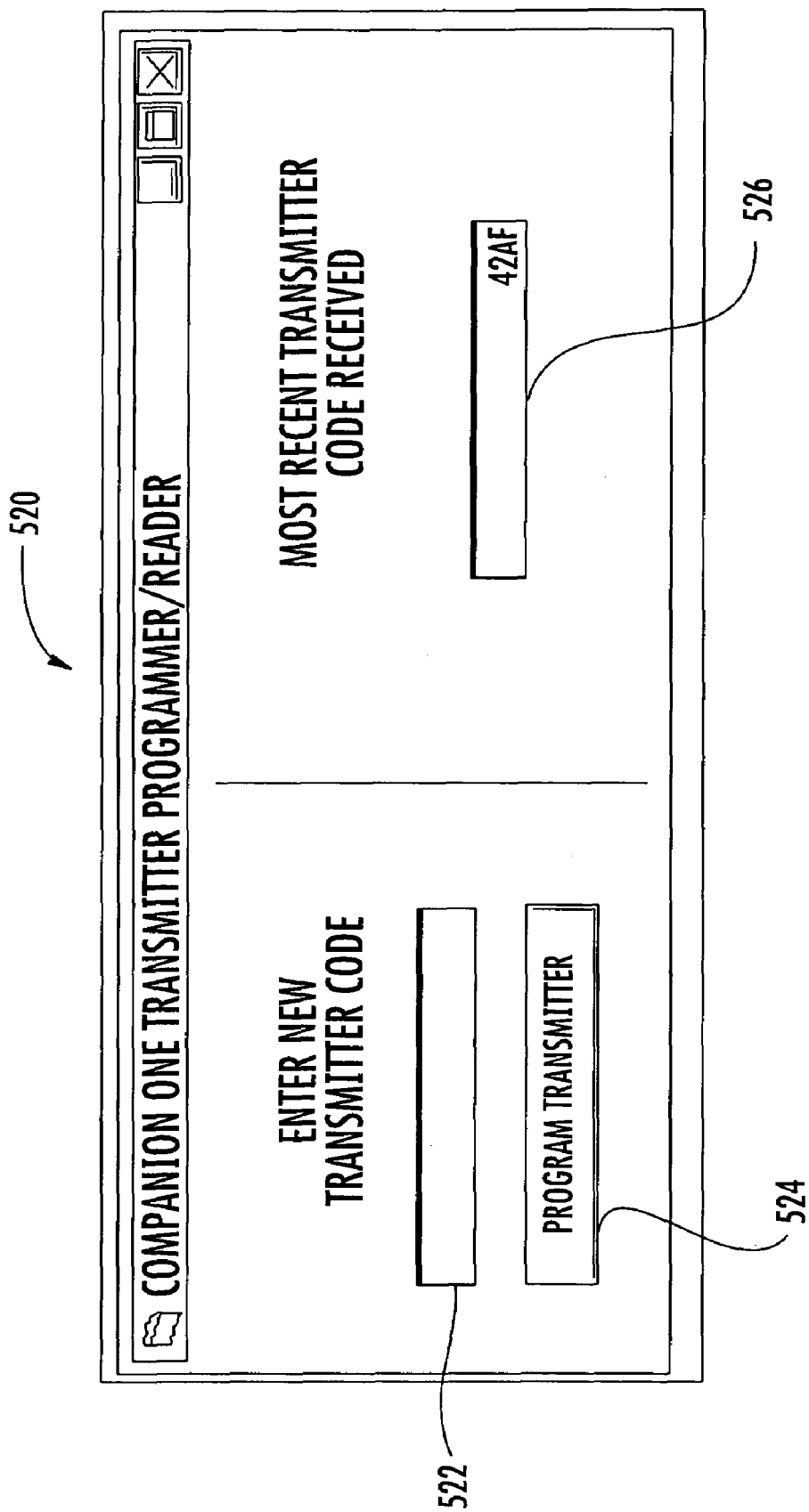
FIG. 12 shows a dialogue box for an application programming running on the personal computer and used to enter and program new transmitter codes.

FIG. 12 is an example of an open window formed as a personal computer application dialog box 520. The application program running on the personal computer could use this dialog box to enter the desired code in the entry field 522. The push button entitled "Program Transmitter" 524 is pushed causing validation of the entered code and its transmission to the programming fixture. The received emergency call transmitter code is displayed in the text box 526 for verification.

FIG. 13 is an exploded isometric view of a type of programming fixture 450 that could include a recess 450a to position the emergency call transmitter as a wireless pendant in the programming fixture. As shown, the pendant 450 includes an oval housing 410a and chain 410b that is worn about the neck of the user. The oval recess 450a receives the emergency call transmitter 410 to ensure that the transmit and receive coils or other code transmitter and code receiver are aligned as closely as possible. A serial or parallel interface accurately 454 on the programming fixture can connect to a personal computer.

Other different embodiments can be used. To avoid continually the monitoring of an input pin of the emergency call transmitter and to conserve battery power required by continual monitoring, the processor could be configured to "wake up" when the data stream from the receive coil commences. Also, the processor could be configured to monitor the input pin only when the RF transmitter is active, or for a few seconds thereafter. This would conserve battery power, but could also be a configuration available in those designs where the processor is powered by a transmitter activation switch.

The programming fixture design as described allows it to be connected via a standard connection to a personal computer. This connection could be parallel, serial, USB or some other standard configuration. Of course, the programming fixture could be a node on an Ethernet or wireless local area network. Because it is often desirable to read the code of an emergency call transmitter after programming, a compatible RF receiver could be incorporated in the programming fixture to send the emergency call transmitter code to the PC application when the emergency call transmitter is activated, such that the personal computer would display the emergency call transmitter code. Also, the programming fixture could be "self-contained" by incorporating further processing capability in a display and other buttons for setting the desired code. A "program" push button could eliminate the requirement for a personal computer.

It is also possible to implement this programming system as described using infrared, by replacing the transmit coil in the programming fixture with an infrared emitter and replacing the receive coil in the emergency call transmitter with an infrared detector. This circuitry is modified and the keyed AC drive to the transmit coil is replaced by a keyed DC drive to an infrared emitter. The receive coil and associated circuitry is replaced by the infrared detector configured as a switch. The emergency call transmitter would require a different housing with a material opaque to visible light, but transparent to infrared.

It is also possible to use a clear material that has an opaque coating in all areas except for that covering the infrared detector. It is also possible to use an opaque material that has a clear insert covering the infrared detector or incorporate an equivalent arrangement. The infrared technology could be used for different embodiments as described. It is also possible to use acoustic wave technology, either audible or ultrasonic, by replacing the transmit coil in the programming fixture with an appropriate transducer. The receive coil in the emergency call transmitter is replaced with a microphone. The transmit coil is replaced by the transducer and the frequency is adjusted to the desired value. The receive coil and its associated circuitry are replaced by a microphone and appropriate signal processing circuitry. Any area covering the microphone should be sufficiently thinned to allow sound to pass. The acoustic wave can be used with the different embodiments as described.

It is also possible to use a magnetic flux system by replacing the transmit coil in the programming fixture with a DC coil and replacing the receive coil in the emergency call transmitter with a reed switch. The keyed AC driving the transmit coil is replaced by keyed DC, and the receive coil and associated circuitry are replaced by the reed switch. Either de-bounce circuitry or an equivalent algorithm can be used in the processor. This magnetic flux system can be applied to different embodiments as described.

It is also possible to use a Hall effect sensor rather than the reed switch in the emergency call transmitter. The reed switch is replaced by the Hall effect sensor and any appropriate conditioning circuitry. Different embodiments can use the Hall effect sensor as described.

This application is related to copending patent application entitled, "SYSTEM AND METHOD FOR DETERMINING THE LOCATION OF A RESIDENT DURING AN EMERGENCY WITHIN A MONITORED AREA HAVING A PLURALITY OF RESIDENCES," which is filed on the same date and by the same assignee and same inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for programming a code for a wireless short range radio frequency (RF) emergency call transmitter used for determining the location of a resident during an emergency within a monitored area having a plurality of residences or rooms comprising:

an emergency call transmitter comprising a sealed housing configured as a wireless pendant to be worn by a user having a receive coil and processor positioned within the housing that processes a transmitter code identifying the emergency call transmitter, and RF transmitter in the housing that is resident activated during an emergency and transmits a help request as the transmitter code in a single RF transmission indicating the identity of the emergency call transmitter, and further comprising a receiver section that receives an infrared or acoustic signal containing a location code received from a location monitor identifying a location, and in response transmitting an RF signal containing the location code to a emergency call receiver, said processor performing level analysis to discriminate comparatively high level signals from a location monitor within a residence or room in which it is located from comparatively low level signals from nearby residences or rooms;

a programming fixture having a transmit coil and a receptacle configured for receiving the housing of the emergency call transmitter such that when the emergency call transmitter is received within the receptacle, the coils within the emergency call transmitter and the programming fixture form an air-core transformer and are aligned in proximity to each other, and a processor operative with the transmit coil for keying an AC signal applied to the transmit coil and imparting a data stream from the receive coil to the processor and programming a new code within the processor of the emergency call transmitter; and wherein the emergency call transmitter is normally in a sleep mode and activated into a wake-up mode when data is received from the programming fixture and from the receive coil for programming a code.

2. A system according to claim 1, wherein the emergency call transmitter is formed as a wireless pendent adapted to be worn by a user.

3. A system according to claim 1, and further comprising a personal computer or local area network to which the programming fixture connects to provide programming instructions.

4. A system according to claim 1, and further comprising a display operative with the programming fixture for displaying a new code programmed within the emergency call transmitter.

5. A system according to claim 1, wherein said programming fixture includes a receiver that receives RF signals containing the new code from the emergency call transmitter for verifying a new code.

6. A system for programming a code for a wireless short range radio frequency (RF) emergency call transmitter used for determining the location of a resident during an emergency within a monitored area having a plurality of residences or rooms comprising:

a wireless transmitter comprising a sealed housing configured as a wireless pendant to be worn by a user having an RF transmitter in the housing that is resident activated during an emergency call that transmits a help request as a transmitter code in a single RF transmission, wherein the transmitter code identifies the wireless transmitter, and a code receiver in the housing that receives a signal containing a transmitter code and a processor in the housing operative with the code receiver and RF transmitter that processes the transmitter code indicating the identity of the emergency call transmitter, and further comprising a receiver section that receives an infrared or acoustic signal containing a location code received from a location monitor identifying a location, and in response transmitting an RF signal containing the location code to a emergency call receiver, said processor performing level analysis to discriminate comparatively high level signals from a location monitor within a room in which it is located from comparatively low level signals from nearby residences or rooms;

a programming fixture having a code transmitter for transmitting a signal containing the code, and a receptacle configured for receiving the wireless transmitter such that when the wireless transmitter is received within the receptacle, the code receiver within the wireless transmitter and the code transmitter are aligned in proximity to each other and operative with each other for transmitting a signal containing a new code from the programming fixture to the wireless transmitter, and a processor operative with the code transmitter for modulating the signal and imparting a data stream from the code transmitter to the code receiver and processor and programming a new code within the processor of the wireless transmitter; and wherein the emergency call transmitter is normally in a sleep mode and activated into a wake-up mode when data is received from the programming fixture and from the receive coil for programming a code.

7. A system according to claim 6, wherein the wireless transmitter is formed as a wireless pendent adapted to be worn by a user within a monitored residence.

8. A system according to claim 6, and further comprising a personal computer or local area network to which the programming fixture connects to provide programming instructions.

9. A system according to claim 6, and further comprising a display connected to the programming fixture for displaying a new code programmed within the wireless transmitter.

10. A system according to claim 6, wherein said programming fixture includes a receiver that receives RF signals containing the new code from the wireless transmitter for verifying a new code.

11. A system according to claim 6, wherein said code transmitter and code receiver are operative for transmitting and receiving an infrared signal.

12. A system according to claim 6, wherein said code transmitter and code receiver are operative for transmitting and receiving an electromagnetic signal.

13. A system according to claim 6, wherein said code transmitter and code receiver operative for transmitting and receiving an acoustic signal.

14. A system according to claim 6, wherein said code transmitter and code receiver are operative for transmitting and receiving a magnetic flux signal.

15. A method for programming a code used by a wireless emergency call transmitter used for determining the location of a resident during an emergency within a monitored area having a plurality of residences or rooms that comprises a sealed housing configured as a wireless pendant to be worn by a user having a receive coil and processor positioned within the housing that processes a transmitter code identifying the emergency call transmitter, and radio frequency (RF) transmitter positioned in the housing and operative with the processor that transmits based on resident activation during an emergency a help request as the transmitter code in a single RF transmitter indicating the identity of the emergency call transmitter, and further comprising a receiver section that receives an infrared or acoustic signal containing a location code received from a location monitor identifying a location, and in response transmitting an RF signal containing the location code to a emergency call receiver, said processor performing level analysis to discriminate comparatively high level signals from a location monitor within a room in which it is located from comparatively low level signals from nearby rooms, which comprises:

inserting the emergency call transmitter within a programming fixture that is configured for receiving the housing of the emergency call transmitter and having a transmit coil such that the coil within the emergency call transmitter and the programming fixture form an air-core transformer and are aligned in proximity to each other;

keying an AC signal applied to the transmit coil for imparting a data stream from the receive coil to the processor and programming a new code within the emergency call transmitter; and wherein the emergency call transmitter is normally in a sleep mode and activated into a wake-up mode when data is received from the programming fixture and from the receive coil.

16. A method according to claim 15, which further comprises forming the emergency call transmitter as a wireless pendent adapted to be worn by a user within a monitored residence.

17. A method according to claim 15, which further comprises connecting the programming fixture to a personal computer or local area network to provide programming instructions.

18. A method according to claim 15, which further comprises user selecting the code and transmitting the user selected code to the programming fixture and emergency call transmitter connected thereto.

19. A method according to claim 15, which further comprises transmitting a new code from the emergency call transmitter to the programming fixture to verify the new code.

20. A method according to claim 15, which further comprises displaying a new code on a display of a personal computer connected to the programming fixture.

21. A method according to claim 15, which further comprises setting a new code for the emergency call transmitter from the programming fixture.

22. A method for programming a code used by a wireless short range radio frequency (RF) emergency call transmitter used for determining the location of a resident during an emergency within a monitored area having a plurality of residences or rooms formed as an emergency cell transmitter that is resident activated during an emergency and comprising a sealed housing configured to be worn by a user as a wireless pendant and having a code receiver and processor positioned within the housing and operative therewith that receives a signal containing a new code and processes the code, and an RF transmitter positioned within the housing that transmits a help request as the transmitter code in a single RF transmission indicating the identity of the emergency call transmitter, and further comprising a receiver section that receives an infrared or acoustic signal containing a location code received from a location monitor identifying a location, and in response transmitting an RF signal containing the location code to a emergency call receiver, said processor performing level analysis to discriminate comparatively high level signals from a location monitor within a room in which it is located from comparatively low level signals from nearby residences or rooms, which comprises:

inserting the short range transmitter within a programming fixture having a receptacle that receives the sealed housing and includes a code transmitter that transmits a signal containing a new transmitter code such that the code transmitter and code receiver are aligned in proximity to each other;

modulating the signal transmitted from the code transmitter for imparting a data stream to the code receiver and the processor and programming a new transmitter code within; and wherein the emergency call transmitter is normally in a sleep mode and activated into a wake-up mode when data is received from the programming fixture and from the receive coil.

23. A method according to claim 22, which further comprises forming the short range RF transmitter as a wireless pendent adapted to be worn by a user.

24. A method according to claim 22, which further comprises connecting the programming fixture to a personal computer or local area network to provide programming instructions.

25. A method according to claim 22, which further comprises transmitting an infrared signal from the code transmitter to the code receiver of the short range transmitter.

26. A method according to claim 22, which further comprises transmitting a magnetic flux signal from the code transmitter to the code receiver of the short range transmitter.

27. A method according to claim 22, which further comprises transmitting an acoustic signal from the code transmitter to the code receiver of the short range transmitter.

28. A method according to claim 22, which further comprises transmitting an electromagnetic field signal from the code transmitter to the code receiver of the short range transmitter.

* * * * *